United States Patent Office 3,484,633
Patented Dec. 16, 1969

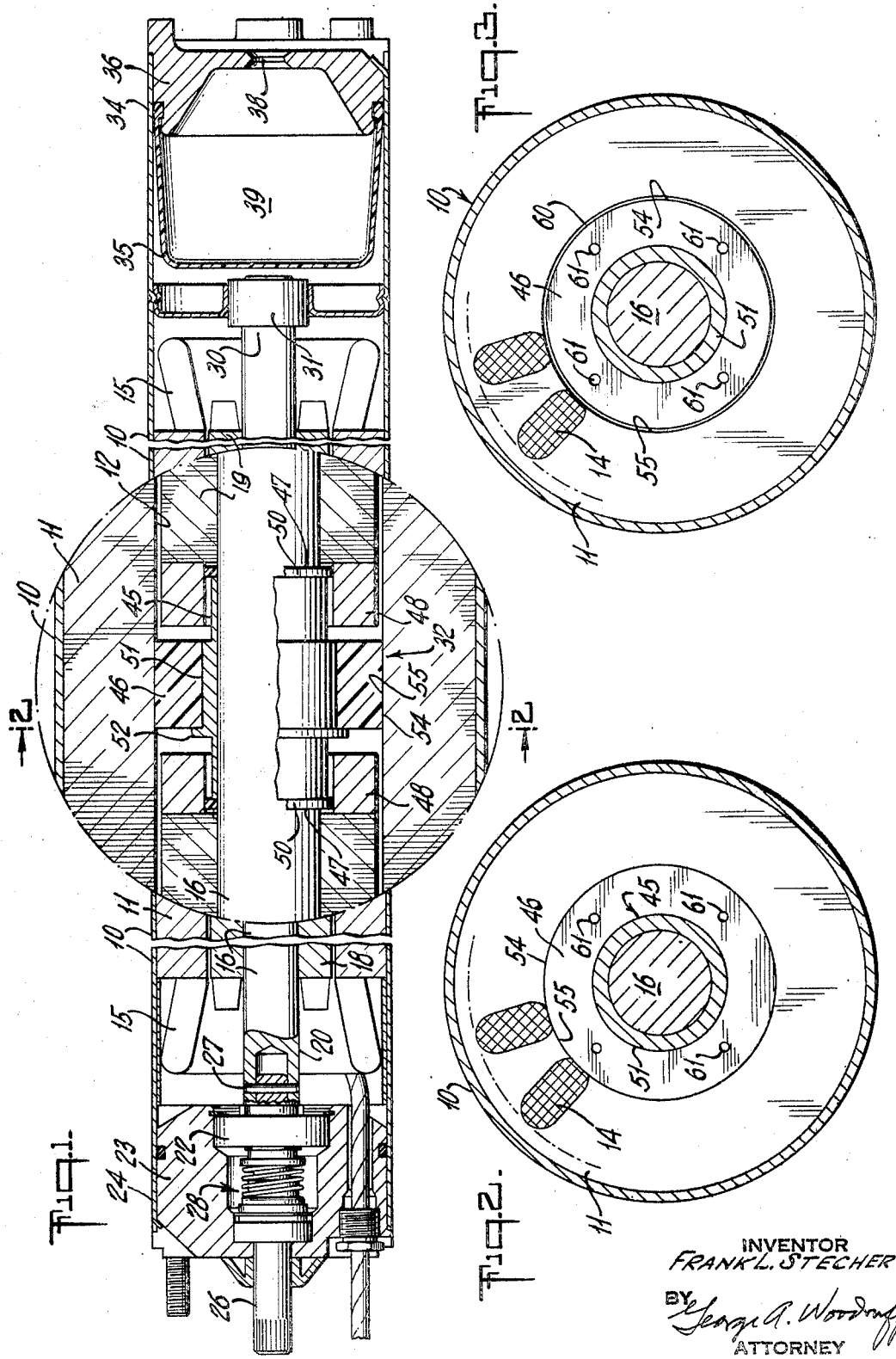

3,484,633
ROTOR SHAFT BEARING FOR SUBMERSIBLE MOTORS
Frank L. Stecher, Overland Park, Kans., assignor to Fairbanks Morse Inc., New York, N.Y., a corporation of Delaware
Filed Aug. 7, 1968, Ser. No. 750,928
Int. Cl. H02k 5/16
U.S. Cl. 310—87                                    5 Claims

ABSTRACT OF THE DISCLOSURE

In a submersible electric motor for close-coupled driving connection with a deep well pump or the like wherein the motor and pump are adapted for operation submerged in the fluid to be pumped, and wherein the motor is of axially long, small diameter character having a casing structure filled with a dielectric fluid, a long stator core therein and a long and slender shaft mounting two or more rotor members in operative relation to the stator core; the provision of improved bearing means for supporting the shaft intermediate its length, as at a shaft region between rotor members, having a bearing support member positioned for engagement with a stationary part of the motor, as the stator core, wherein said support member is comprised of a dielectric, fluid absorbing material which in response to saturation thereof by the dielectric fluid in the motor, swells or expands into firm seating engagement with the stator core, thereby to dispose the bearing in fixed, non-rotative position in the motor.

---

This invention relates to submersible electric motors of the type employed for close-coupled driving association with a deep well pump wherein the pump and motor are submerged in the fluid to be pumped, and wherein such motor is of small diameter for accommodation in a well casing and of great length to permit motor construction for desired high power output. In a motor of this type having a long slender shaft for the motor rotor, it is necessary to afford in addition to bearings at the shaft ends, bearing support means intermediate to the shaft ends, and accordingly the present invention concerns more particularly the provision of improved intermediate bearings means for the shaft of a motor of the type indicated.

In a motor of the aforesaid character having a long slender shaft supporting the rotor which usually is provided by separate rotor sections spaced along the shaft, there is a marked tendency of the shaft to undergo lateral deflections in response to forces imposed thereon by the magnetic field. Unless counteracted as by intermediate bearing means, such shaft deflections will result in rubbing contact of the rotor sections against the motor stator core, with consequent rotation restriction and damage to the parts. While it is known to employ intermediate bearings to meet the shaft deflection problem, mounting of such bearings has required such expedients as sectionalizing the motor structure with the intermediate bearing inserted between sections, or in the case of a unitary motor casing, sectionalizing the stator core to permit insertion of the intermediate bearing between the core sections. However, in a motor of the character to which this invention is directed, having a unitary casing and a single long stator core for cooperation with all rotor sections on the shaft, and wherein for cooling purposes the motor is filled with a suitable dielectric fluid, as oil for example, which requires sealing of the motor casing against leakage, great difficulty has been encountered in properly locating and mounting an intermediate bearing of known form in the small diameter bore of the stator core.

An object of the present invention, therefore, is to provide for a submersible motor of the character indicated, an intermediate bearing of an improved character obviating the aforementioned difficulty.

Another object is to provide for a submersible motor of the character indicated, an intermediate bearing formed as a complete bearing unit for mounting in proper position on the shaft in assembly of the motor rotor sections thereon, the bearing unit having a shaft engaging portion and a mounting element on said portion wherein said element is of a fluid absorbent character affording in an initial dry condition thereof clearance relative to the stator core bore, whereby to adapt the bearing unit for ready insertion with the shaft and rotor sections into the stator core, the element responding to the fluid contained in the motor in assembled condition thereof, by fluid absorption with resultant expansion of the element into abutment against the bore wall of the stator core, thereby firmly fixing the bearing unit in the stator core.

Another object is to provide an intermediate bearing unit of the character indicated in the foregoing object, wherein the said fluid absorbent mounting element of the bearing is formed of non-metallic, dielectric material having adequate bearing support strength, the mounting element thus insulating the shaft and rotor sections from grounding through the bearing unit to the stator core, as well as preventing eddy current losses at the bearing.

These and other objects of the invention will appear from the following description of a presently preferred embodiment, as illustrated in the accompanying drawings, wherein:

FIG. 1 illustrates a submersible motor of the character indicated having an intermediate shaft bearing according to the present invention, the view being in longitudinal section and greatly enlarged in the region of the bearing;

FIG. 2 is a transverse sectional elevation in the region of the intermediate bearing, as taken along line 2—2 in FIG. 1, and FIG. 3 is a sectional view corresponding to that of FIG. 2 but showing the intermediate bearing in an initial condition thereof prior to fluid filling of the motor casing.

Referring to FIG. 1, the submersible motor there exemplified includes a unitary or one piece tubular casing 10 of very appreciable length and relatively small diameter, supporting therein a single elongate stator core 11 of annular form presenting a rotor receiving bore 12 therethrough. As indicated in FIG. 2, the core is appropriately slotted to receive stator windings, as 14, the opposite end turns of which appear at 15 (FIG. 1) axially beyond the core ends. Extending axially through the stator bore 12 is a unitary, long and relatively slender motor shaft 16 mounting separate induction type motor rotor members, there being two such members shown at 18 and 19 in the present example, each cooperating with the adjacent portion of the single stator core.

The drive end 20 of shaft 16 is supported by a suitable bearing 22 preferably of thrust bearing type carried in a casing end closure member 23 at casing end 24, member 23 affording the motor mount for assembly connection of the motor to the driven device as a pump (not shown). Power output from the motor to the driven device is made by a stub shaft 26 connected at 27 to the motor shaft end 20 and projecting outwardly through the casing end closure 23. Sealing the casing structure at end closure 23 in respect to the projecting stub shaft 26, is a rotary-type fluid seal assembly generally indicated at 28.

Shaft 16 is supported at its opposite end 30 by a radial bearing assembly 31 mounted to the casing 10, and is further supported intermediate its length by intermediate bearing assembly 32 of novel character in accordance with the present invention, to be hereinafter described. As shown in FIG. 1, the casing 10 at its end portion 34 beyond bearing 31, is closed by a flexible diaphragm 35 in sealing connection to the casing through a casing end wall member 36, the latter having an apertrue 38 communicating the space 39 between the diaphragm and wall member with the motor exterior. Such diaphragm and apertured casing end wall member represent a known and much used expedient for submersible motors of coolant fluid filled type as here concerned, to provide for pressure equalization between the external fluid in which the motor is submerged and the coolant fluid within the motor.

As hereinbefore noted in respect to a submersible motor of the character here concerned, it is important for effective motor operation to afford motor shaft support intermediate its ends. Heretofore, it has been a major problem to provide effective bearing means for the purpose, capable of ready insertion in the small diameter bore of the stator core and firm shaft support mounting to the core. That problem is met and overcome by the novel intermediate bearing 32 now to be described.

The shaft supported motor rotor members 18 and 19 are dimensioned lengthwise to afford full magnetic cooperation with the single stator core, yet to provide a spaced-apart relation thereof at their adjacent ends sufficient to accommodate the intermediate bearing 32 therebetween. As shown in FIG. 1, bearing 32 comprises a tubular bushing 45 of suitable bearing material, as brass or bronze metal, sleeved on the central intermediate portion of shaft 16, and an annular bearing support 46 for mounting the bushing in the stator core in non-rotative position relative to the shaft. The bushing 45 is of a length approximating the axial distance between the opposed ends 47 of the core bodies of rotor members 18 and 19, thus having each end portion underlying but clear of the end ring 48 of the adjacent rotor member, as this appears in FIG. 1. Further, the bushing is confined against axial displacement by washers 50 between the bushing and the ends 47 of the core bodies, these washers serving additionally to remove the ends of the non-rotative bushing from frictional contact with the core ends 47 of the rotor members.

According to the present example, bushing 45 is formed in its central region to provide an annular external boss 51 having a projecting annular shoulder 52 at one side, the axial extent of the boss being such as to afford appreciable clearance relative to the end rings 48 of the rotor members in the assembled position of the bushing, as illustrated in FIG. 1. Boss 51 provides a seat for the annular support element 46, the latter being formed for press-fit on the boss to a position abutting the shoulder 52, and to have an axial dimension approximating that of the boss, whereby the element has corresponding clearance with respect to the rotor end rings 48. In the assembled, operational condition of the submersible motor illustrated, having a coolant fluid of dielectric character as a suitable dielectric oil filling the motor interior (which serves also for bearing lubrication), the support element 46 has its outer circumferential surface 54 in firm abutment with the overlying bore wall portion 55 of the stator core, thereby mounting the intermediate bearing 32 to the stator core in non-rotative position relative to the rotor shaft. Assembly abutment of the element 46 with the indicated bore wall portion of the stator core, is here attained according to the present invention in the manner now to be described.

Annular support element 46 is formed of a non-metallic, dielectric material selected in relation to the character of the particular coolant fluid utilized in the motor, for its capability of absorbing the fluid with resultant swelling or expansion, and for high resistance to degrading or other deleterious physical and/or chemical reaction to the fluid used. Additional criteria in such material selection, are an adequate degree of bearing impact strength; retention of a solid state at ambient temperatures up to at least about 180° F., and ready machinability.

In sealed, fluid filled submersible motors of the kind illustrated, it is usual to employ a dielectric oil as the coolant fluid, and in respect to such oil there are a number of different materials readily available and generally of low cost, which meet the criteria hereinbefore expressed. Among these are thermo-plastic materials such as those marketed under the well-known trademark "Nylon" and "Delrin," and other phenolic base plastics. As presently preferred, the material of the bearing element 46 in the bearing according to this invention, is a laminated cellulose fabric bounded by a thermosetting phenol-formaldehyde resin. The material used is more particularly identified in the 1955 standards edition of the American Society for Testing Materials (ASTM), Part 6, on page 38 titled "Tentative Specifications for Laminated Thermosetting Materials" concerning material designated as "ASTM Designation: D709–55T," and in Appendix 1 on page 59, as "Grade C" under the heading "Type 11. Cellulose Fabric-Base Laminated Material."

The support element 46 is provided to have in its non-impregnated or dry state, an outer diameter of a predetermined dimension less than the diametral dimension of the stator core bore 12, and an inner diameter sufficient to afford a press fit of the element on the sleeve bearing seat 51. In motor assembly, the shaft 16, rotor members 18 and 19 and the intermediate bearing 32 are pre-assembled as a unit, and such unit then is inserted endwise into the stator bore 12 to proper position therein with the shaft ends supported by the bearings 22 and 31. Therefore, assembly insertion of the rotor unit is here facilitated in respect to the intermediate bearing, since in that assembly step the bearing support element 46 is in a dry state having an outer diameter less than the diameter of the stator core bore to an extent affording sufficient clearance for ready passage of the element into core bore. Moreover and importantly herein, the dimension of its outer diameter in the dry state of the element is predetermined not only in respect to affording the above noted assembly clearance, but with due regard to the degree of expansion increase of such diameter consequent to saturation absorbtion of fluid by the element upon exposure to the particular cooling fluid filling the motor, as dielectric oil in the present example. Thus the element is formed to have a dry state outer diameter which in respect to the larger diameter bore of the stator core, is such that in the fluid saturated, diametrically expanded condition of the element, its peripheral surface 54 will be in abutment with the overlying stator bore surface 55 (FIG. 1) under pressure engagement therewith sufficient to maintain the intermediate bearing 32 in core mounted position and against rotation under the influence of the rotating motor shaft. In a typical example related to a 4 inch diameter submersible motor wherein the diameter of the stator core bore is 2 inches, it is found that the support element 46 comprised of the presently preferred material hereinbefore mentioned and formed to have a dry state outer diameter approximately or in the order of 1.998 inches, adequately meets both the assembly clearance and the fluid absorbtion-expansion conditions above set forth. Dry state clearance of the element in the stator bore is illustrated in FIG. 3, the clearance space 60 however being shown in greatly exaggerated extent.

To facilitate transfer of cooling fluid from one side of the intermediate bearing to the other side thereof in the assembled, operational condition of the motor, the bearing element 46 is provided to have one or more holes or passages extending axially through the element. As shown in FIG. 2, four such holes 61 are provided in equally spaced relation.

In connection with the intermediate bearing 32 as now described, it is to be noted that the bearing support element 46 being formed of non-metallic, dielectric material, insulates the shaft and rotor members from electrical grounding to the stator core at the zone of the bearing, and eliminates eddy current losses at the bearing. Further, in removal of the motor rotor unit as for repair or replacement of the intermediate bearing should that be necessary for any reason, it is found that the element 46 yields readily to a relatively small endwise pulling force exerted on the shaft, by sliding displacement axially along the bore of the stator core.

Having now illustrated and described a presently preferred embodiment of the invention, it is to be understood that such may be modified without departing from the scope of the invention as hereinafter claimed.

I claim:

1. In an electric motor having a closed casing filled with a coolant fluid, a motor stator in the casing having an axial bore, a shaft extending through said bore and supporting at least two axially spaced apart rotor members for cooperation with said stator, and bearing means carried by the casing for rotatably supporting opposite end portions of the shaft, the improvement therein of an intermediate bearing engaging the shaft between said rotors, said intermediate bearing including a support element exposed to said coolant fluid and having a peripheral surface opposed to an adjacent surface portion of the stator bore, and said support element being comprised of fluid-absorbing material reacting to fluid absorption by expansion to firm seating of its peripheral surface against the said adjacent surface of the stator bore.

2. In an electric motor according to claim 1 wherein the said support element is formed of non-metallic dielectric material.

3. In a submersible electric motor having a closed casing filled with a coolant dielectric oil, a motor stator in the casing having an axial bore, a shaft extending through the stator bore and supporting at least two axially spaced apart rotor members for cooperation with said stator, and bearing means on the casing for rotatably supporting opposite end portions of the shaft, the length of the shaft between said bearing means being such that the shaft tends to undergo lateral deflections in motor operation, the improvement therein of intermediate bearing means associated with the shaft to prevent lateral shaft deflections, said intermediate bearing means comprising a bearing member sleeved on said shaft between said spaced rotors thereon, and an annular support element on said bearing member exposed to said coolant oil and having a peripheral surface opposed to an adjacent surface portion of the stator bore, said support element being comprised of oil-absorbing material reacting to oil absorption by expansion to firm seating of its peripheral surface against the said adjacent surface of the stator bore.

4. In a submersible electric motor according to claim 3 wherein the said support element is formed of non-metallic dielectric material.

5. In a submersible electric motor adapted to be filled with a dielectric fluid for motor cooling and bearing lubrication, comprising a closed casing, a motor stator therein having an axial bore, a shaft extending through the stator bore, at least two rotor members axially spaced apart on the shaft and cooperating with said stator, and casing supported bearing means for the opposite ends of the shaft, the improvement therein comprising an intermediate shaft bearing providing a sleeve bearing element on the shaft between said spaced rotor members, and an annular support element mounted on the sleeve bearing element and having an outer circumferential face opposed to an adjacent surface portion of the stator bore, said support element being formed of non-metallic, dielectric material of a character to absorb said dielectric fluid and react thereto by expansion, the support element prior to dielectric fluid filling of the motor in motor assembly having said face thereof spaced from said adjacent surface portion of the stator bore, and upon motor filling with the dielectric fluid and absorption of the fluid by the support element, expanding to firm engagement of its said face against said adjacent surface portion of the stator bore.

References Cited
UNITED STATES PATENTS

| | | | |
|---|---|---|---|
| 2,781,464 | 2/1957 | Timms | 310—90 |
| 2,876,370 | 3/1959 | Pleuger et al. | 310—87 |
| 3,136,905 | 6/1964 | Zapf et al. | 310—87 |
| 3,191,079 | 6/1965 | Gitzendanner | 310—90 X |

WARREN E. RAY, Primary Examiner

U.S. Cl. X.R.
308—238; 310—90